US008403314B2

(12) United States Patent
Chung et al.

(10) Patent No.: US 8,403,314 B2
(45) Date of Patent: *Mar. 26, 2013

(54) DOG HOLE LAYOUT FOR A WORKBENCH SYSTEM

(75) Inventors: Brian Hyuk Joon Chung, Arlington Heights, IL (US); Christopher Heflin, Oak Park, IL (US); Jennifer Faith Uzumcu, Vernon Hills, IL (US); Gregg Michael Mangialardi, Park Ridge, IL (US)

(73) Assignee: Robert Bosch GmbH, Stuttgart (DE)

( * ) Notice: Subject to any disclaimer, the term of this patent is extended or adjusted under 35 U.S.C. 154(b) by 1240 days.

This patent is subject to a terminal disclaimer.

(21) Appl. No.: 11/899,863

(22) Filed: Sep. 7, 2007

(65) Prior Publication Data

US 2009/0065992 A1 Mar. 12, 2009

(51) Int. Cl.
*B23Q 3/02* (2006.01)
*B25B 5/16* (2006.01)

(52) U.S. Cl. ......................... 269/283; 269/136; 269/138

(58) Field of Classification Search .................. 269/136, 269/138, 900, 289 R, 291
See application file for complete search history.

(56) References Cited

U.S. PATENT DOCUMENTS

| | | | | |
|---|---|---|---|---|
| 118,662 A | | 8/1871 | Whitman | |
| 198,763 A | | 1/1878 | Cook | |
| 233,986 A | | 11/1880 | Cook | |
| 990,186 A | | 4/1911 | Berg | |
| 1,954,708 A | * | 4/1934 | Mass | 269/104 |
| 2,158,490 A | * | 5/1939 | Webster | 279/123 |
| 3,175,820 A | * | 3/1965 | Schiler | 269/296 |
| 4,076,229 A | | 2/1978 | Hickman | |
| 4,127,260 A | | 11/1978 | Hickman | |
| 4,170,345 A | | 10/1979 | Townsend | |
| 4,248,411 A | * | 2/1981 | Wagster et al. | 269/67 |
| 4,382,589 A | * | 5/1983 | Cammi | 269/50 |
| 4,415,149 A | * | 11/1983 | Rees | 269/88 |
| 4,555,099 A | | 11/1985 | Hilton | |
| 4,625,951 A | * | 12/1986 | Yang | 269/88 |
| 4,711,437 A | * | 12/1987 | Longenecker et al. | 269/91 |
| 4,794,687 A | * | 1/1989 | Peters et al. | 29/559 |
| 4,860,807 A | | 8/1989 | Vacchiano | |
| 4,880,221 A | | 11/1989 | Richards | |
| 5,186,228 A | | 2/1993 | Stafford | |
| 5,284,331 A | * | 2/1994 | Lee et al. | 269/16 |
| 5,351,730 A | | 10/1994 | Lewellen et al. | |
| 5,437,440 A | * | 8/1995 | Keaton | 269/24 |
| D372,135 S | | 7/1996 | Lee et al. | |
| 5,535,995 A | * | 7/1996 | Swann et al. | 269/43 |
| 5,562,277 A | * | 10/1996 | Swann et al. | 269/43 |

(Continued)

*Primary Examiner* — Lee D Wilson
*Assistant Examiner* — Alvin Grant
(74) *Attorney, Agent, or Firm* — Maginot, Moore & Beck

(57) ABSTRACT

A workbench system is disclosed which may include a work surface with a first dog hole, a second dog hole spaced apart from the first dog hole and a plurality of dogs, each of the plurality of dogs including a body defining a first and second securing portion, and a stem portion extending away from the body and configured to fit into the first and second dog holes such that the first securing portions of the first and the second of the plurality of dogs are spaced apart with respect to an axis extending along the first work surface portion at a distance corresponding to a first commonly sized work piece width and the second securing portions of the first and the second of the plurality of dogs are spaced apart with respect to the axis at a distance corresponding to a second commonly sized work piece width.

14 Claims, 5 Drawing Sheets

U.S. PATENT DOCUMENTS

| | | | | | |
|---|---|---|---|---|---|
| 5,582,397 | A | * | 12/1996 | Lanvin | 269/25 |
| 5,732,937 | A | * | 3/1998 | Morghen | 269/47 |
| 5,802,780 | A | | 9/1998 | Hammerschlag | |
| 5,845,740 | A | * | 12/1998 | Bouwkamp | 182/45 |
| 5,862,842 | A | | 1/1999 | You | |
| 5,975,788 | A | * | 11/1999 | Cousins et al. | 403/289 |
| 6,113,088 | A | * | 9/2000 | Gakhar et al. | 269/139 |
| 6,148,881 | A | * | 11/2000 | Valenzuela | 144/286.1 |
| 6,668,695 | B2 | | 12/2003 | Poole et al. | |
| 6,688,208 | B2 | | 2/2004 | Campbell et al. | |
| 6,848,684 | B2 | | 2/2005 | Fortin et al. | |
| 6,886,820 | B1 | * | 5/2005 | Hausler, III | 269/24 |
| 7,628,186 | B2 | * | 12/2009 | Blum | 144/286.1 |
| 2010/0064873 | A1 | * | 3/2010 | Chung et al. | 83/829 |

* cited by examiner

DOG HOLE LAYOUT FOR A WORKBENCH SYSTEM

FIELD OF THE INVENTION

This invention relates to the field of devices used to support work pieces and more particularly to a device for holding lumber.

BACKGROUND

Workbenches are useful in supporting a work piece such as a piece of lumber or metal. Such devices are frequently provided with a clamping device for securing the work piece. In certain workbenches, a split table top is used to clamp the work piece. Some workbenches further incorporate a pattern of holes into which a user places a dog. The dog, which protrudes out of the hole, provides a surface against which the work piece can be clamped.

A problem which arises with prior art workbenches is that clamping devices incorporate gear systems to move the device against a work piece. While effective, gear mechanisms are heavy and add to the cost of the device. Additionally, waste particles may fall into the gear mechanism either jamming the gear mechanism or making the gear mechanism more difficult to operate.

In other systems, a work piece is constrained from movement by pressure applied to the sides of the work piece. When shaping the work piece, however, a force is frequently applied in a direction through the upper surface of the work piece. For example, a circular saw may bind in the work piece, thereby applying a pressure tending to lift the work piece off of the workbench. To avoid movement of the work piece off of the workbench as a result of these forces, a substantial amount of pressure must be applied to the sides of the work piece. Such pressure may be acceptable for various metal work pieces; however, the sides of a piece of lumber may be marred before sufficient force is applied to avoid undesired movement.

What is needed is a system which can mount work pieces to a workbench without the need for a gearing mechanism. What is further needed is a system which restrains movement of a work piece off of the surface of a workbench without relying upon pressure applied to the sides of the work piece.

SUMMARY

In accordance with one embodiment of the present invention, there is provided a workbench system which includes a work surface with a first dog hole, a second dog hole spaced apart from the first dog hole and a plurality of dogs, each of the plurality of dogs including a body defining a first and second securing portion, and a stem portion extending away from the body and configured to fit into the first and second dog holes such that the first securing portions of the first and the second of the plurality of dogs are spaced apart with respect to an axis extending along the first work surface portion at a distance corresponding to a first commonly sized work piece width and the second securing portions of the first and the second of the plurality of dogs are spaced apart with respect to the axis at a distance corresponding to a second commonly sized work piece width.

In accordance with another embodiment of the present invention, there is provided a workbench system including a workbench with a work surface and an axis extending along the work surface, a first dog hole in the work surface and located on the axis, a second dog hole in the work surface and located at a first distance away from the axis, and a third dog hole in the work surface and located at the first distance away from the axis and offset from the second dog hole along the axis, and a plurality of dogs, each of the plurality of dogs including (i) a body, (ii) a stem portion extending away from the body and configured to fit into the first dog hole, the second dog hole and the third dog hole, (iii) a first securing portion with a surface spaced apart from the stem by a first offset, and (iv) a second securing portion with a surface spaced apart from the stem by a second offset, wherein the first distance minus two times the first offset is approximately equal to the width of a first commonly commercially available piece of lumber, and the first distance minus two times the second offset is approximately equal to the width of a second commonly commercially available piece of lumber.

DESCRIPTION

Figure 1:
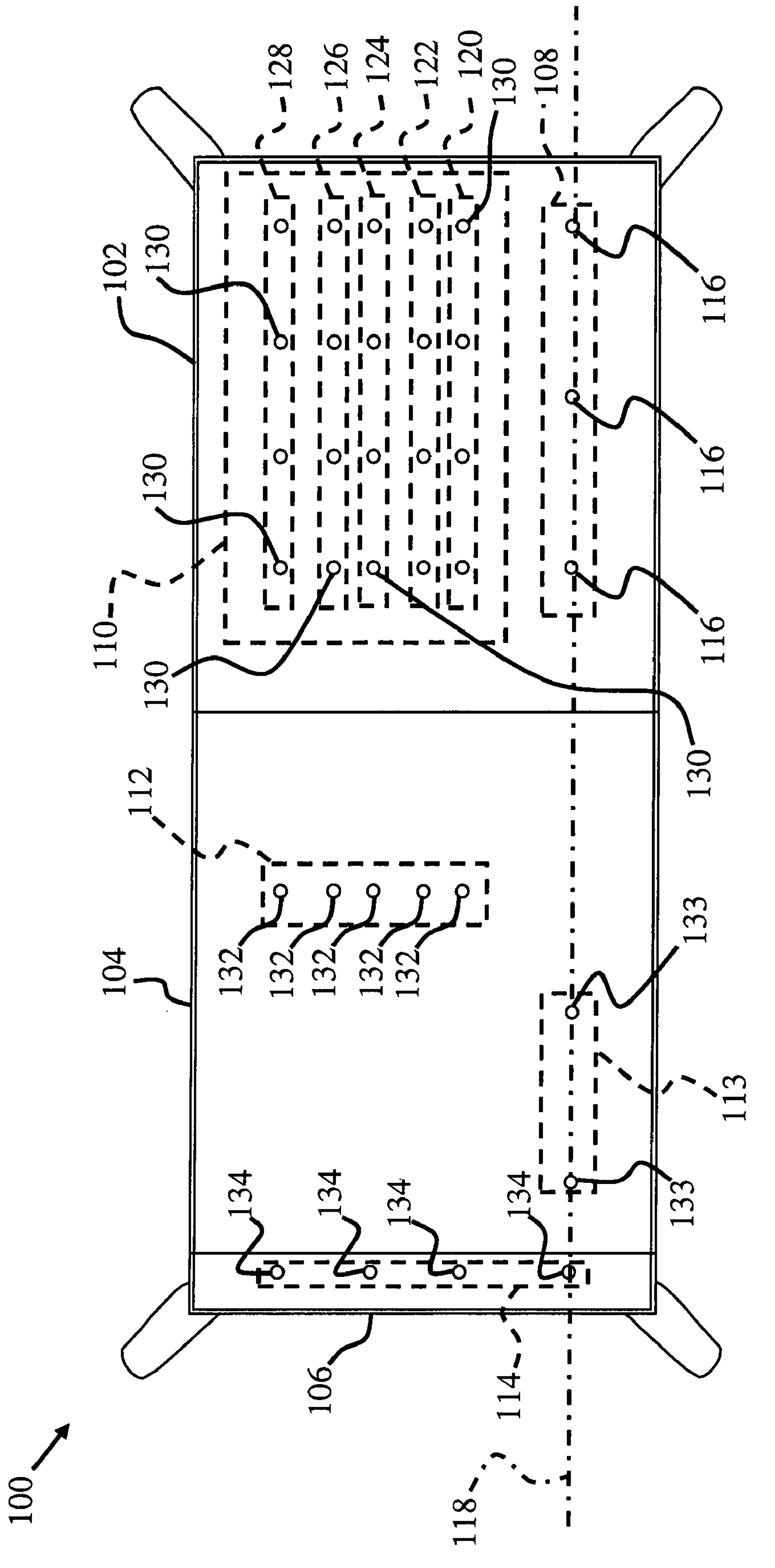
FIG. 1 shows a top plan view of a workbench in a workbench system incorporating a dog hole pattern in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 shows a top plan view of a workbench 100 that may be used in a workbench system. The workbench 100 includes a stationary work surface 102, a movable work surface 104 and a telescoping work surface 106. The stationary work surface 102 includes a base dog hole portion 108 and dog hole array 110. The movable work surface 104 includes a dog hole portion 112 and a dog hole portion 113 and the telescoping work surface 106 includes a dog hole portion 114.

The base dog hole portion 108 in this embodiment includes three dog holes 116. The dog holes 116 define an axis 118 that extends across the stationary work surface 102, the movable work surface 104 and the telescoping work surface 106. The dog hole array 110 includes five sets of dog holes 120, 122, 124, 126, and 128. Each set of dog holes 120, 122, 124, 126, and 128 include four dog holes 130. Each of the dog holes 130 within each of the five dog hole sets 120, 122, 124, 126, and 128 are equidistant from the axis 118. The outermost dog holes 130 in the dog hole sets 120, 122, 124, 126, and 128 are vertically aligned along the axis 118 with one of the dog holes 116 as viewed in FIG. 1 while the inner dog holes 130 are offset along the axis 118 from each of the dog holes 116.

The dog hole portion 112 includes five dog holes 132. One of the dog holes 132 is aligned with each of the dog hole sets 120, 122, 124, 126, and 128. That is, the dog holes 132 are each spaced apart from the axis 118 by the same distance as the dog holes 130 in a respective one of the dog hole sets 120, 122, 124, 126, and 128. The dog hole portion 113 includes two dog holes 133. The dog holes 133 are aligned with the dog holes 116 in the base dog hole set 108.

The dog hole portion 114 includes four dog holes 134. One of the dog holes 134 is aligned with the dog holes 116 in the base dog hole set 108. The remaining dog holes 134 are aligned with one of the dog hole sets 120, 124, or 128. That is, the dog holes 134 are each spaced apart from the axis 118 by the same distance as the dog holes 130 in a respective one of the dog hole sets 120, 124, and 128.

Figure 2:
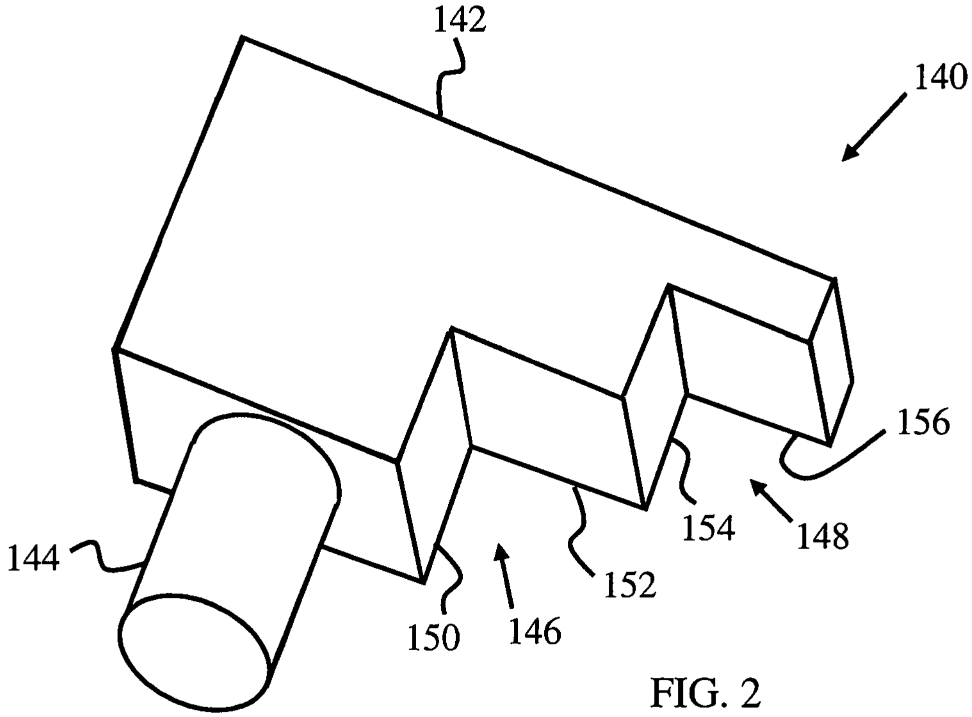
FIG. 2 shows a perspective view of a dog in the workbench system that can be used in the dog holes of FIG. 1 in accordance with principles of the present invention.
Figure 3:
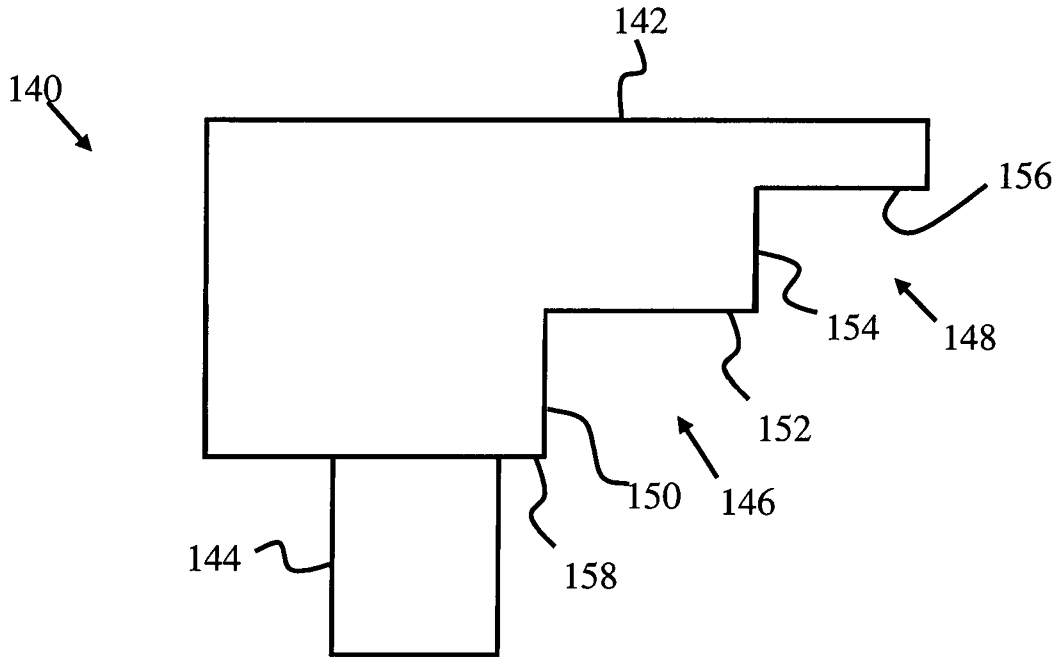
FIG. 3 shows a side plan view of the dog of FIG. 2.

FIGS. 2 and 3 show a dog 140 which is configured for use with each of the dog holes 116, 130, 132, 133 and 134. The dog 140 includes a body portion 142 and a stem portion 144, a lower securing configuration 146 and an upper securing configuration 148. The lower securing configuration 146 includes a securing portion 150 and a vertical restraint 152. Likewise, the upper securing configuration 148 includes a securing portion 154 and a vertical restraint 156. The securing portion 150 is spaced apart from the stem portion 144 by a spacing portion 158. The securing portion 154 is spaced apart from the securing portion 150 by the length of the vertical restraint 152.

The configuration of the dog holes 116, 130, 132, 133 and 134 along with the dimensions of the dogs 140 in the embodiments of FIGS. 1 and 2 have been selected to allow pieces of lumber in commonly commercially available sizes to be securely mounted to the workbench 100. Thus, as shown in FIG. 4, a piece of lumber 160 is mounted to the workbench 100 using four dogs 162, 164, 166 and 168 which are configured like the dog 140.

Figure 5:
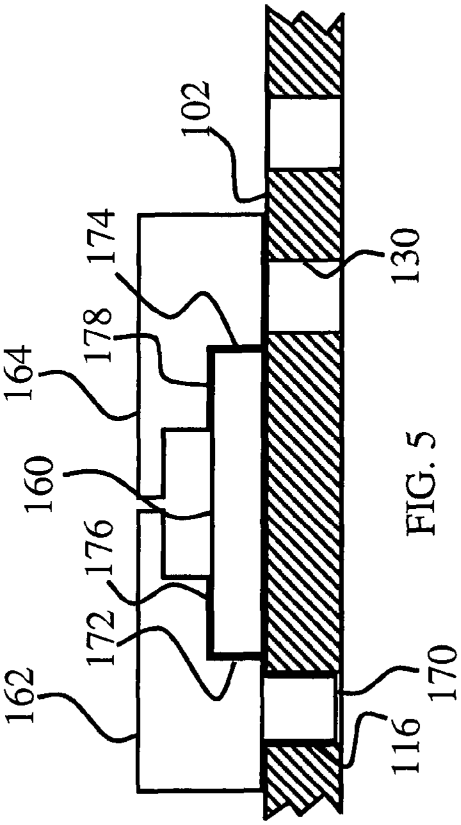
FIG. 5 shows a partial cross-sectional view of the workbench and dog configuration of FIG. 4 wherein the lumber is secured within the lower securing areas of the dogs.

Referring to FIG. 5, the dog 162 includes a stem 170 which is located within a dog hole 116. Similarly, the dog 164 is positioned within one of the dog holes 130 in the dog hole set 120, the dog 164 is located in the dog hole 132 that is aligned with the dog holes 130 in the dog hole set 120, and the dog 168 is positioned within the dog hole 134 aligned with the dog holes 116.

Figure 4:
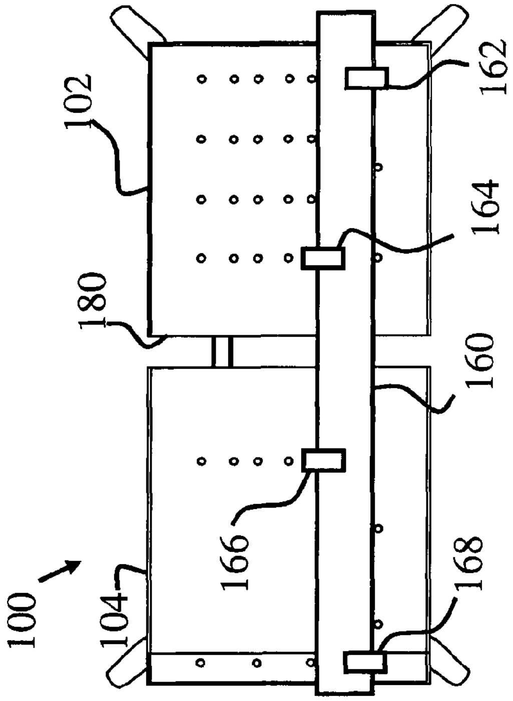
FIG. 4 shows a top plan view of the workbench of FIG. 1 and a plurality of dogs of FIG. 2 holding a piece of lumber.

When positioned in the manner shown in FIGS. 4 and 5, a securing portion 172 of the dog 162 abuts one side of the lumber 160 while a securing portion 174 of the dog 164 abuts the opposite side of the lumber 160. Likewise, securing portions (not shown) of the dogs 166 and 168 abut opposing sides of the lumber 160. Accordingly, the lumber 160 is secured from movement crosswise to the axis defined by the dog holes 116.

Additionally, a vertical restraint 176 of the dog 162 abuts the top side of the lumber 160 as does a vertical restraint 178 of the dog 164. Likewise, vertical restraints (not shown) of the dogs 166 and 168 abut the topside of the lumber 160. Accordingly, the lumber 160 is restrained from movement off of the workbench 100.

With the lumber 160 thus mounted to the workbench 100, a user can make a cut along either end of the lumber 160. Additionally, the movable work surface 104 is movable with respect to the stationary work surface 102. Moving the movable work surface 104 away from the stationary work surface 102 provides a channel 180 as shown in FIG. 4. The channel 180, which may be modified in width, allows the user to perform operations such as drilling a hole through the lumber 160 without damaging the workbench 100.

Figure 6:
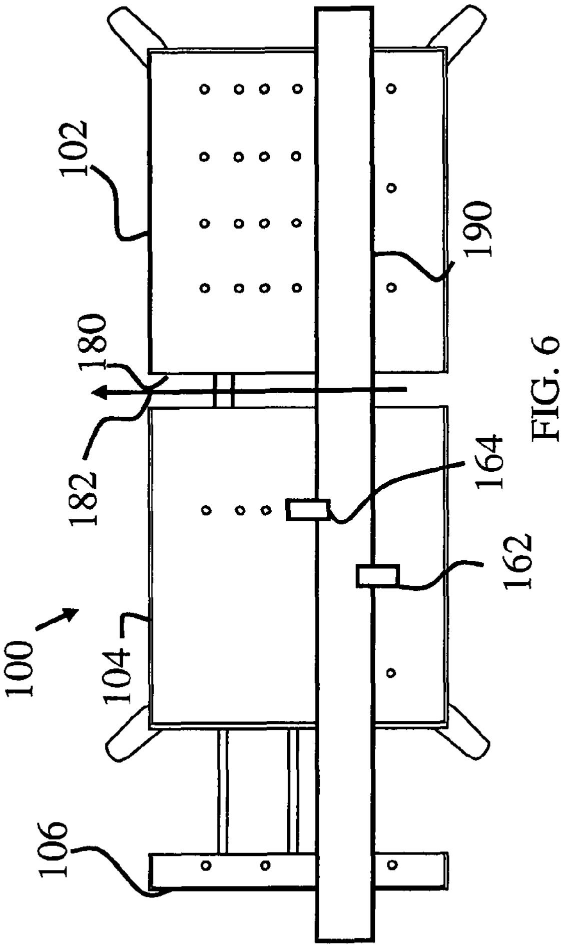
FIG. 6 shows a top plan view of the workbench of FIG. 1 and a plurality of dogs of FIG. 2 holding a piece of lumber that is the same width as the piece of lumber in FIG. 4 but is thicker than the piece of lumber of FIG. 4.
Figure 7:
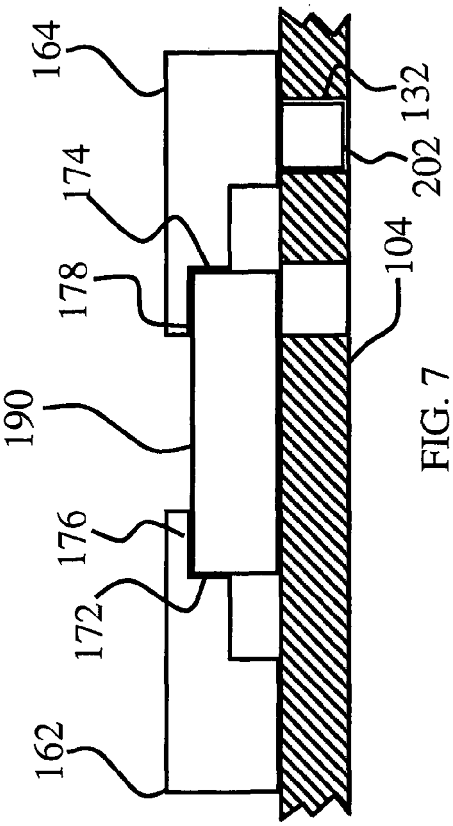
FIG. 7 shows a partial cross-sectional view of the workbench and dog configuration of FIG. 6 wherein the lumber is secured within the upper securing areas of the dogs and the dogs are spaced further apart as compared with the spacing of FIG. 5.

The workbench system may also be used to mount a piece of lumber of a different depth but the same width as the lumber 160. For example, FIGS. 6 and 7 show a piece of lumber 190 mounted to the workbench 100 using two dogs 162 and 164. The stem 170 (not shown in FIG. 7) is located within a dog hole 133. To accommodate the different cross-section of the lumber 190 as compared to the lumber 160, the stem 202 of the dog 164 is positioned within the dog hole 132 that is aligned with the dog holes 130 in the dog hole set 122.

When positioned in the manner shown in FIGS. 6 and 7, a securing portion 192 of the dog 162 abuts one side of the lumber 190 while a securing portion 194 of the dog 164 abuts the opposite side of the lumber 190. Accordingly, the lumber 190 is secured from movement crosswise to the axis defined by the dog holes 116. Additionally, a vertical restraint 196 of the dog 162 abuts the top side of the lumber 190 as does a vertical restraint 198 of the dog 164. Accordingly, the lumber 190 is restrained from movement off of the workbench 100.

As with the configuration of FIG. 4, a user can make a cut along either end of the lumber 190. Additionally, in FIG. 6 the telescoping work surface 106 has been extended to provide support for the additional length of the lumber 190. Thus, a user may perform operations such as drilling on the lumber 190 at a location between the telescoping work surface 106 and the movable work surface 104. Moreover, positioning all of the dogs (in this example dogs 162 and 164) on the same side of the channel 180 allows the lumber 190 to be cut along the arrow 182 without damaging the workbench 100. Alternatively a permanent channel may be provided within a stationary work surface to allow for lumber or other work pieces to be cut. When making cuts along the channel 180, the lumber should be mounted with dogs positioned on the same side of the channel 180 to avoid binding.

Figure 8:
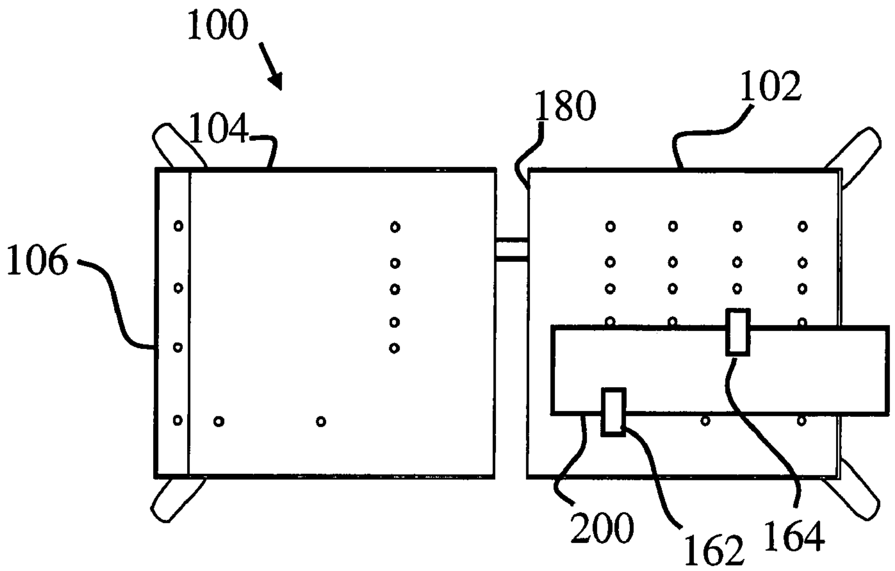
FIG. 8 shows a top plan view of the workbench of FIG. 1 and a plurality of dogs of FIG. 2 holding a piece of lumber that is the same thickness as the piece of lumber in FIG. 4 but is wider than the piece of lumber of FIG. 4.
Figure 9:
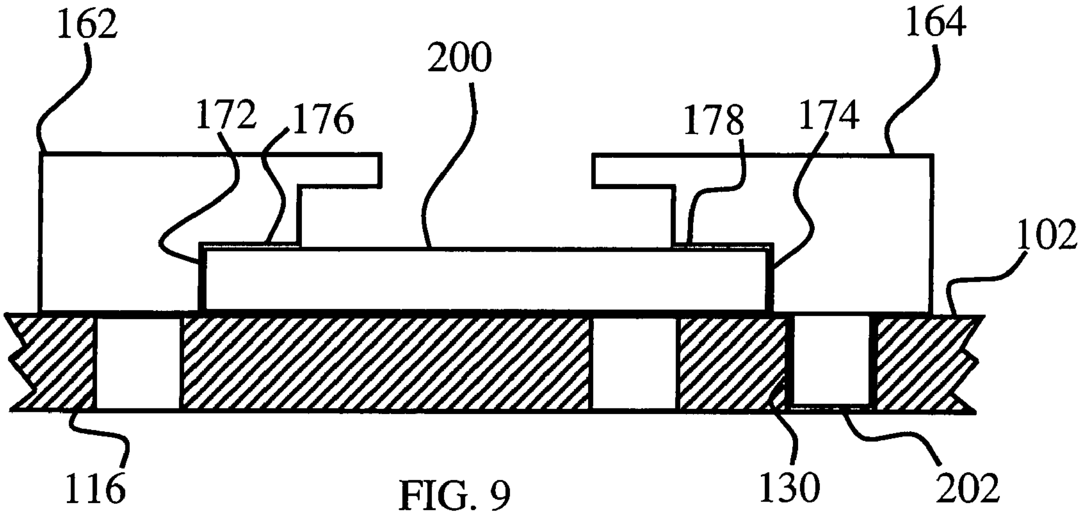
FIG. 9 shows a partial cross-sectional view of the workbench and dog configuration of FIG. 8 wherein the lumber is secured within the lower securing areas of the dogs and the dogs are spaced apart by the same amount as the dogs of FIG. 5.

With the spacing of dogs that results from the use of the dog holes 116 and/or 133 and the dog holes 130 in the dog hole set 122 and/or the dog holes 132 in the dog hole set 112, a work piece that is wider and shorter than the lumber 190 may also be mounted to the workbench 100. By way of example, FIGS. 8 and 9 show a piece of lumber 200 mounted to the workbench 100 using dogs 162 and 164. As with the lumber 190, the stem 170 (not shown in FIG. 9) is located within a dog hole 116. Additionally, as shown in FIG. 9, the stem 202 of the dog 164 is in a dog hole 130 of the dog hole set 122.

When positioned in the manner shown in FIGS. 8 and 9, the securing portion 172 of the dog 162 abuts one side of the lumber 200 while the securing portion 174 of the dog 164 abuts the opposite side of the lumber 200. Accordingly, the lumber 200 is secured from movement crosswise to the axis defined by the dog holes 116. Additionally, the vertical restraint 176 of the dog 162 abuts the top side of the lumber 200 as does the vertical restraint 178 of the dog 164. Accordingly, the lumber 200 is restrained from movement off of the workbench 100.

In like manner, two or more of the dogs 162, 164, 166 and 168 may be used in the dog holes 130 of the dog hole sets 124, 126 and 128 and the dog holes 132 to mount other commonly sized work pieces. In one embodiment, the dog holes 130 in the dog hole set 120 are spaced apart from the axis 118 defined by the dog holes 116 by 126.06 mm. Additionally, the lower securing portion 150, the upper securing portion 154 of the dog 140 are about 19 mm in height and the vertical restraint 152 in the lower securing configuration 146 is about 19 mm in length. This allows either a 2"×2" or a 1"×4" piece of lumber to be mounted to the workbench 100.

By spacing the remaining dog hole sets at 2 inch intervals, the workbench system may further be used to mount either a 1"×6" or 2"×4" piece of lumber using the dog holes 130 in the dog hole set 122. Likewise, a 1"×8" or 2"×6" piece of lumber may be mounted using the dog holes 130 in the dog hole set 124, a 1"×10" or 2"×8" piece of lumber may be mounted using the dog holes 130 in the dog hole set 126, and a 1"×12" or 2"×10" piece of lumber may be mounted using the dog holes 130 in the dog hole set 128.

Figure 10:
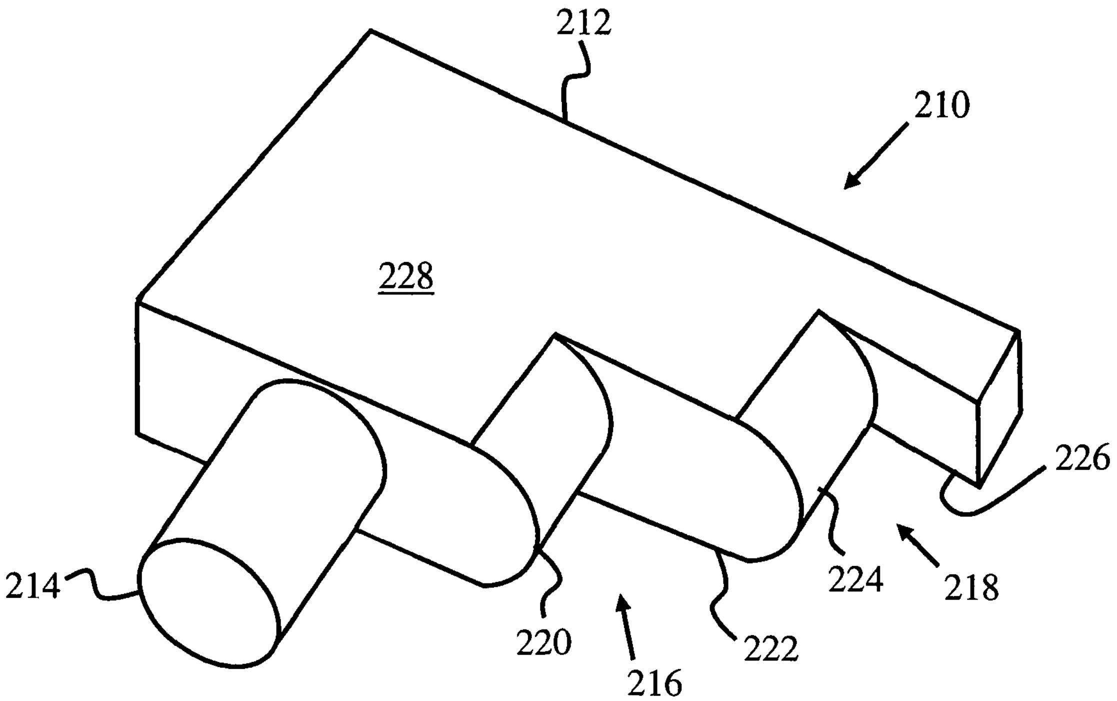
FIG. 10 shows a perspective view of an alternative dog that can be used in the dog holes of FIG. 1 in accordance with principles of the present invention.
Figure 11:
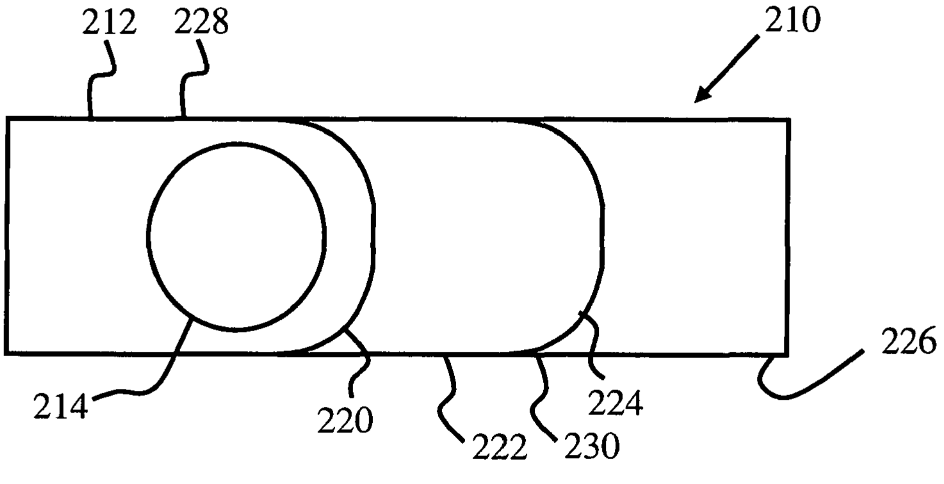
FIG. 11 shows a bottom plan view of the dog of FIG. 10.

An alternative dog 210 that may be used in a workbench system including the workbench 100 is shown in FIGS. 10 and 11. The dog 210 includes a body portion 212 and a stem portion 214, a lower securing configuration 216 and an upper securing configuration 218. The lower securing configuration 216 includes a securing portion 220 and a vertical restraint 222. Likewise, the upper securing configuration 218 includes a securing portion 224 and a vertical restraint 226.

One difference between the dog 210 and the dog 140 is that the securing portions 220 and 224 curve the side 228 of the body 212 to the opposite side 230 of the body 212. Thus, the dog 210 may be placed into a dog hole with either side 228 or 230 of the body 212 parallel to the side of a work piece. Subsequent rotation of the dog 210 so that the vertical restraint 226 projects over the top of the work piece rotates the securing portion 220 or the securing portion 224 into contact with the work piece.

In the embodiment described above each of the dog holes 116, 130, 132 and 134 are circular with the same diameter. In alternative embodiments wherein rotation of the dog within the dog hole is not desired, some or all of the dog holes may be shaped or keyed. Thus, the dog holes and dog stems may include cooperating features which assist in establishing a desired orientation of the dog with respect to the dog hole.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A workbench system comprising:

a first work surface portion;

a first dog hole in the first work surface portion;

a second dog hole spaced apart from the first dog hole; and a plurality of dogs, each of the plurality of dogs including a body defining a first securing portion and a second securing portion, and a stem portion extending away from the body and configured to fit into the first dog hole and the second dog hole, wherein each of the plurality of dogs is configured such that when the stem of a first dog of the plurality of dogs is inserted within the first dog hole and the stem of a second dog of the plurality of dogs is inserted within the second dog hole, the first dog and the second dog can be positioned without modifying the relative position of the first dog hole and the second dog hole such that (i) a first securing plane defined by the first securing portion of the first dog is parallel with a second securing plane defined by the first securing portion of the second dog, and the minimum distance between the first securing plane and the second securing plane corresponds to a first commonly sized work piece width, and (ii) a third securing plane defined by the second securing portion of the first dog is parallel with a fourth securing plane defined by the second securing portion of the second dog, and the minimum distance between the third securing plane and the fourth securing plane corresponds to a second commonly sized work piece width.

2. The workbench system of claim 1, further comprising:

a second work surface portion;

a channel separating the first work surface portion and the second work surface portion; and a third dog hole in the second work surface portion, wherein the second dog hole and the third dog hole define an axis and the stem portion of each of the plurality of dogs is configured to fit into the third dog hole, such that when the stem of the first of the plurality of dogs is inserted within the first dog hole and the stem of the second of the plurality of dogs is inserted within the third dog hole, the first securing planes of the first and the second dogs are parallel to the axis and spaced apart by a minimum distance corresponding to the first commonly sized work piece width and the second securing planes of the first and the second dogs are parallel to the axis and spaced apart by a minimum distance corresponding to the second commonly sized work piece width.

3. The workbench system of claim 2, wherein the second dog hole is located within the first work surface portion.

4. The workbench system of claim 2, wherein the width of the channel is variable.

5. The workbench system of claim 2, wherein the first dog hole and the second dog hole are offset along the axis.

6. The workbench system of claim 2, further comprising:

a fourth dog hole; and a fifth dog hole wherein:

the stem portion of each of the plurality of dogs is configured to fit into the fourth dog hole, and the fifth dog hole;

when the stem of the first dog is inserted within the first dog hole and the stem of the second dog is inserted within the fourth dog hole, the first securing planes of the first and the second dogs are parallel to the axis and spaced apart by a minimum distance corresponding to the second commonly sized work piece width and the second securing planes of the first and the second dogs are parallel to the axis and spaced apart by a minimum distance corresponding to a third commonly sized work piece width;

when the stem of the first dog is inserted within the first dog hole and the stem of the second dog is inserted within the fifth dog hole, the first securing planes of the first and the second dogs are parallel to the axis and spaced apart by a minimum distance corresponding to the third commonly sized work piece width and the second securing planes of the first and the second dogs are parallel to the axis and spaced apart by a minimum distance corresponding to a fourth commonly sized work piece width.

7. The workbench system of claim 1, further comprising:

a first vertical restraint configured such that when the first securing portion is adjacent to a side of a first work piece, the first vertical restraint is adjacent to and above the top surface of the first work piece; and a second vertical restraint configured such that when the second securing portion is adjacent to a side of a second work piece, the first vertical restraint is adjacent to and above the top surface of the second work piece.

8. A workbench system comprising:

a workbench including a work surface and an axis extending along the work surface, a first dog hole in the work surface and located on the axis, a second dog hole in the work surface and located at a first distance away from the axis, and a third dog hole in the work surface and located at the first distance away from the axis and offset from the second dog hole along the axis; and a plurality of dogs, each of the plurality of dogs including (i) a body, (ii) a stem portion extending away from the body and configured to fit into the first dog hole, the second dog hole and the third dog hole, (iii) a first securing portion with a surface spaced apart from the stem by a first fixed offset, and (iv) a second securing portion with a surface spaced apart from the stem by a second fixed offset, wherein the first distance minus two times the first fixed offset is approximately equal to the width of a first commonly commercially available piece of lumber, and the first distance minus two times the second fixed offset is approximately equal to the width of a second commonly commercially available piece of lumber.

9. The workbench system of claim 8, each of the plurality of dogs further comprising:

a first vertical restraint; and a second vertical restraint, wherein each of the plurality of dogs is configured such that when the dog is inserted into one of the first dog hole, the second dog hole or the third dog hole, the first vertical restraint is positioned at a height above the work surface approximately equal to the height of the first commonly commercially available piece of lumber, and the second vertical restraint is positioned at a height above the work surface approximately equal to the height of the second commonly commercially available piece of lumber.

10. The workbench system of claim 8, further comprising:

a channel extending across the work surface, the channel substantially perpendicular to the axis.

11. The workbench system of claim 8, further comprising:

a fourth dog hole in the work surface located at a second distance away from the axis; and a fifth dog hole in the work surface located at the second distance away from the axis and offset from the fourth dog hole along the axis, wherein:

the stem portion of each of the plurality of dogs is configured to fit into the fourth dog hole and the fifth dog hole; and the second distance minus two times the first fixed offset is approximately equal to the width of a third commonly commercially available piece of lumber, and the second distance minus two times the second fixed offset is approximately equal to the width of a fourth commonly commercially available piece of lumber.

12. The workbench system of claim 11, wherein the first distance minus two times the first fixed offset is approximately equal to the second distance minus two times the second fixed offset.

13. The workbench system of claim 12, further comprising:

a sixth dog hole in the work surface located at a third distance away from the axis; and a seventh dog hole in the work surface located at the third distance away from the axis and offset from the sixth dog hole along the axis, wherein:

the stem portion of each of the plurality of dogs is configured to fit into the sixth dog hole and the seventh dog hole; and the third distance minus two times the first fixed offset is approximately equal to the width of a fifth commonly commercially available piece of lumber, and the third distance minus two times the second fixed offset is approximately equal to the width of a sixth commonly commercially available piece of lumber.

14. The workbench system of claim 13, wherein the second distance minus two times the first fixed offset is approximately equal to the third distance minus two times the second fixed offset.

* * * * *